US010544789B2

(12) United States Patent
Lambert et al.

(10) Patent No.: US 10,544,789 B2
(45) Date of Patent: Jan. 28, 2020

(54) AXIAL FLUX ELECTRICAL MOTOR AND FAN ASSEMBLY AND METHODS OF ASSEMBLING THE SAME

(71) Applicant: Regal Beloit Australia Pty Ltd., Rowville, Victoria (AU)

(72) Inventors: Nicholas Neville Lambert, Franklin South (AU); Richard P. Harris, Emerald (AU); Byron Kennedy, Victoria (AU); Matthew J. Turner, Victoria (AU); Hani Chahine, Victoria (AU)

(73) Assignee: Regal Beloit America, Inc., Beloit, WI (US)

( * ) Notice: Subject to any disclaimer, the term of this patent is extended or adjusted under 35 U.S.C. 154(b) by 307 days.

(21) Appl. No.: 15/028,657

(22) PCT Filed: Apr. 18, 2014

(86) PCT No.: PCT/AU2014/000455
§ 371 (c)(1),
(2) Date: Apr. 11, 2016

(87) PCT Pub. No.: WO2015/051396
PCT Pub. Date: Apr. 16, 2015

(65) Prior Publication Data
US 2016/0238011 A1 Aug. 18, 2016

Related U.S. Application Data

(60) Provisional application No. 61/889,317, filed on Oct. 10, 2013.

(51) Int. Cl.
*F04D 25/06* (2006.01)
*F04D 29/42* (2006.01)
(Continued)

(52) U.S. Cl.
CPC ....... *F04D 25/0653* (2013.01); *F04D 25/068* (2013.01); *F04D 25/0693* (2013.01);
(Continued)

(58) Field of Classification Search
CPC ............ F04D 25/0606; F04D 25/0653; F04D 25/0693; F04D 29/281; F04D 29/4206;
(Continued)

(56) References Cited

U.S. PATENT DOCUMENTS 3,829,250 A * 8/1974 Samson, Jr. ............ F04D 17/16
415/206
4,428,719 A * 1/1984 Hayashibara ....... F04D 25/0606
417/354

(Continued)

FOREIGN PATENT DOCUMENTS

CN 102044917 A 5/2001
DE 29501695 U1 * 6/1995 ......... F04D 25/0653
(Continued)

OTHER PUBLICATIONS

First China Office Action for related application No. 201480067159. 3, dated Nov. 20, 2017, 17 Pages.
European Search Report for related Application No. 14851743 dated Feb. 3, 2017; 8 pp.

*Primary Examiner* — Kenneth J Hansen
(74) *Attorney, Agent, or Firm* — Armstrong Teasdale LLP

(57) ABSTRACT

A fan assembly includes an axis of rotation and a fan that includes an inlet ring and a rear plate that together define an inner fan chamber, wherein the fan is a backward curved plug fan. The fan assembly also includes an axial flux motor coupled to the rear plate such that the motor is positioned entirely outside the fan chamber to facilitate preventing interference between the motor and an airflow within the fan chamber.

18 Claims, 8 Drawing Sheets

(51) Int. Cl.
*F04D 25/12* (2006.01)
*F04D 25/08* (2006.01)
*F04D 29/28* (2006.01)

(52) U.S. Cl.
CPC ............ *F04D 25/08* (2013.01); *F04D 25/12* (2013.01); *F04D 29/281* (2013.01); *F04D 29/4226* (2013.01)

(58) Field of Classification Search
CPC ..... F04D 29/4226; F04D 25/12; H02K 21/24; H02K 1/2793
USPC ....... 310/68 B, 62, 63, 67 R, 68 R; 318/3, 4, 318/34
See application file for complete search history.

(56) References Cited

U.S. PATENT DOCUMENTS

| | | | |
|---|---|---|---|
| 4,884,946 A | | 12/1989 | Belanger et al. |
| 4,885,488 A | | 12/1989 | Cox |
| 4,917,572 A | * | 4/1990 | Van Houten ............ F04D 17/16 415/121.2 |
| 2008/0018187 A1 | * | 1/2008 | Yamaguchi ............ H02K 1/182 310/81 |
| 2013/0170945 A1 | * | 7/2013 | Gatley, Jr. ............ F04D 29/422 415/1 |

FOREIGN PATENT DOCUMENTS

| | | |
|---|---|---|
| DE | 102008007810 A1 | 8/2009 |
| EP | 0814269 A2 | 12/1997 |
| FR | 1530959 A | 6/1968 |

\* cited by examiner

AXIAL FLUX ELECTRICAL MOTOR AND FAN ASSEMBLY AND METHODS OF ASSEMBLING THE SAME

CROSS-REFERENCE TO RELATED APPLICATIONS

This application is a National Stage application of International Application No. PCT/AU2014/000455, filed on Apr. 18, 2014, which claims benefit of U.S. Provisional Application No. 61/889,317 filed Oct. 10, 2013, both of which are hereby incorporated by reference in their entireties.

BACKGROUND

The embodiments described herein relate generally to axial flux electrical motors, and more particularly, to axial flux electrical motor and fan assemblies for use in forced air or air circulating systems.

Many known commercial ventilation, heating, and air conditioning systems require air propulsion units. In addition to providing movement of air for such systems, air propulsion units may be used in combination with condenser units or to supplement other heat transfer operations. Some known air propulsion units are motor driven fans. These fans may be, for example, a centrifugal impeller type fan driven by a radial flux motor. However, some known radial flux motors and/or their mounting components extend a distance into the fan that restricts entering and exiting air and produces aerodynamic losses that negatively affect the overall performance of the fan.

Furthermore, at least some known motors may generate undesired torque ripple pulsations, which may cause vibrations, and potentially motor noise, any amount of which may be objectionable to a user. Further, the torque ripple pulsations of the motor may be transmitted to the fan and cause additional unacceptable noise.

At least some known centrifugal fans use one or a combination of three basic fan blade designs: radial, forward curved, and backward curved. Generally, backward curved fans, also known as plug fans, are more efficient than forward curved fans and radial bladed fans.

BRIEF DESCRIPTION

In one aspect, a backward curved plug fan assembly is provided. The fan assembly includes an axis of rotation and a fan that includes an inlet ring and a rear plate that together define an inner fan chamber. The fan assembly also includes an axial flux motor coupled to the rear plate such that the motor is positioned entirely outside the fan chamber to facilitate preventing interference between the motor and an airflow within the fan chamber.

In another aspect, a backward curved plug fan assembly is provided. The fan assembly includes an axis of rotation and a fan including an inlet ring and a rear plate that together define an inner fan chamber. The fan assembly also includes an axial flux motor coupled to the rear plate to facilitate rotation of the fan about the axis. The motor extends a predetermined distance from the rear plate into the fan chamber to facilitate reducing interference between the motor and an airflow within the fan chamber.

In yet another aspect, a method for assembling a backward curved plug fan assembly is provided. The method includes providing a fan including an inlet ring and a rear plate that together define an inner fan chamber. The method also includes coupling an axial flux motor to the rear plate such that the motor is positioned entirely outside the fan chamber to facilitate preventing interference between the motor and an airflow within the fan chamber.

BRIEF DESCRIPTION OF THE DRAWINGS

The embodiments described herein relate generally to axial flux electrical motors, and more particularly, to axial flux electrical motor and fan assemblies for use in forced air or air circulating systems.

DETAILED DESCRIPTION

Figure 1:
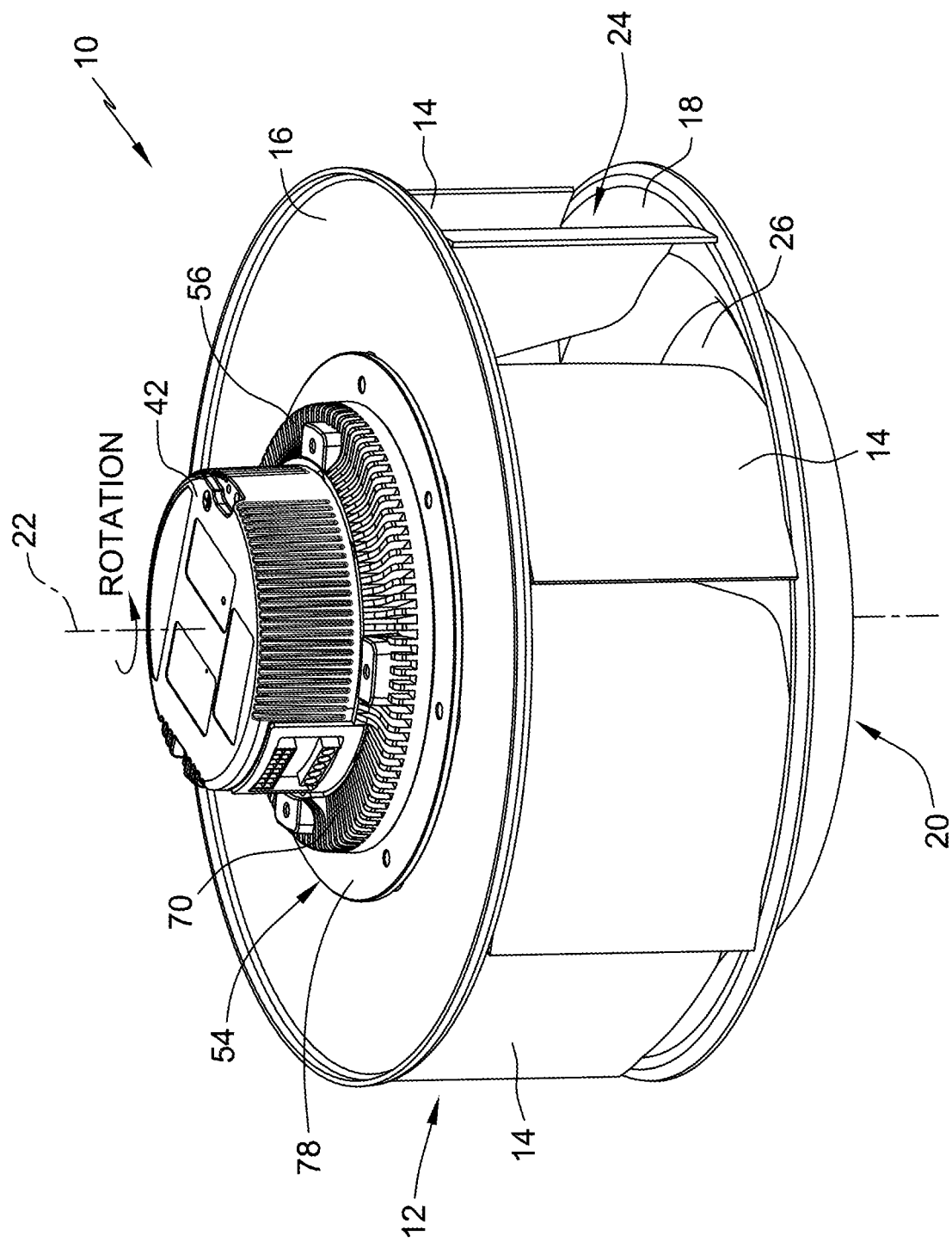
FIG. 1 is a perspective view of one embodiment of a fan assembly.
Figure 2:
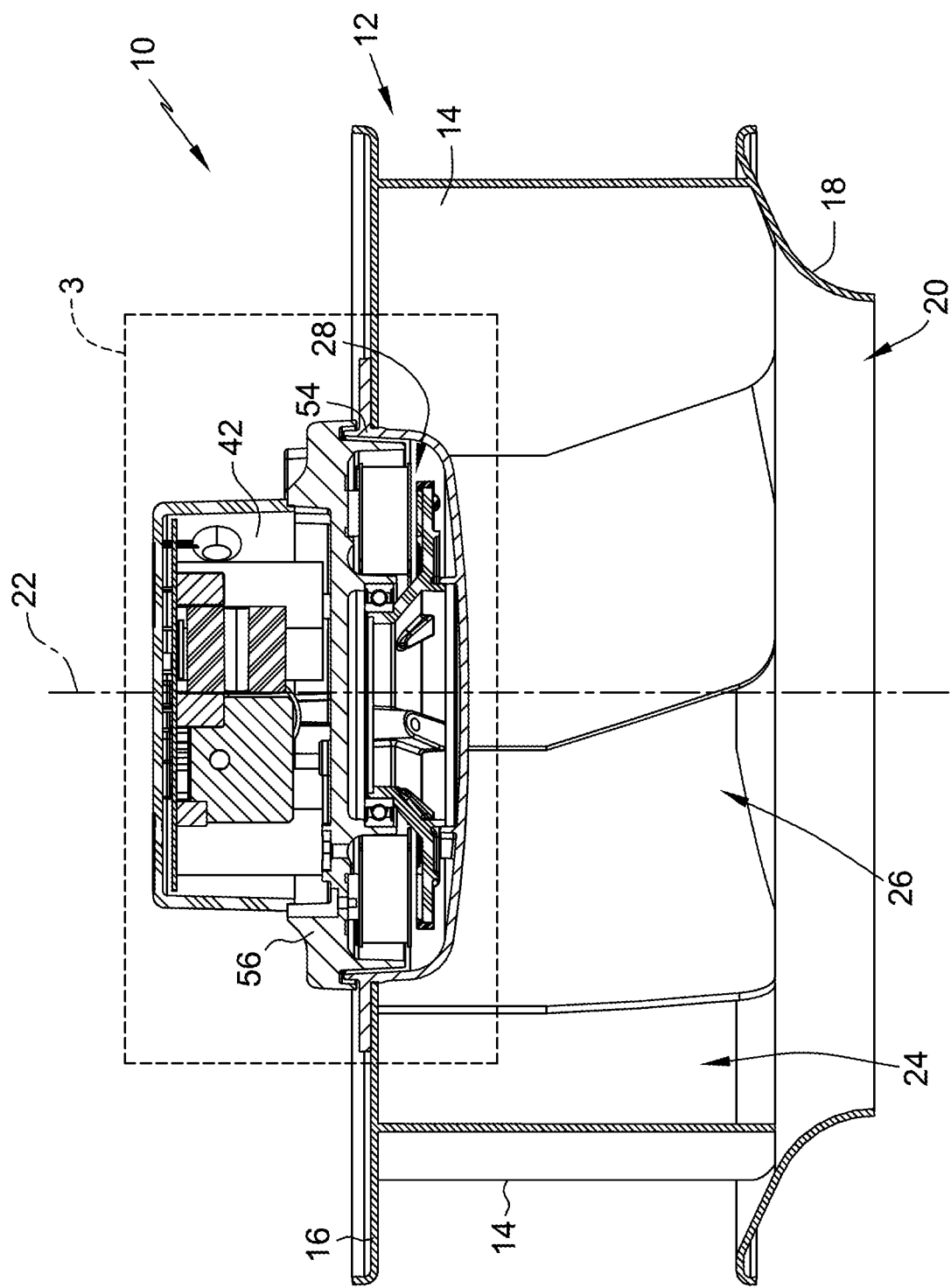
FIG. 2 is a cross-sectional view of the fan assembly of FIG. 1 taken along line 2-2.

FIG. 1 is a perspective view of one embodiment of a centrifugal fan assembly 10, and FIG. 2 is a cross-section view of fan assembly 10. In this embodiment, fan assembly 10 is configured to produce a flow of air for a forced air system, e.g., a commercial or industrial HVAC system. Fan assembly 10 includes a fan 12 that includes a plurality of blades 14 coupled between a rear plate 16 and an inlet ring 18. Inlet ring 18 includes a central air inlet 20. In one embodiment, fan 12 is a backward curved plug fan. Alternatively, fan 12 may have any suitable blade shape, for example a backward curved blade, an airfoil blade, a backward inclined blade, a forward curved blade, and a radial blade, that enables fan assembly 10 to operate as described herein.

Rear plate 16 and inlet ring 18 are coaxial or substantially coaxial and configured to rotate about a center axis 22. Blades 14 are attached to rear plate 16 and/or inlet ring 18 such that each blade 14 extends between rear plate 16 and inlet ring 18. In one embodiment, each blade 14 may be attached to rear plate 16 and/or inlet ring 18 via features formed in rear plate 16 and/or inlet ring 18 such as an opening, e.g., a groove or a slot, configured to restrict an amount of movement of blade 14 between rear plate 16 and inlet ring 18 while permitting blades 14 to operate as described herein. During rotation, blades 14 are configured to pull in air along center axis 22 and eject the air radially outward through an outlet 24 located between adjacent blades 14. Blades 14 may be coupled to rear plate 16 and/or inlet ring 18 in any manner that permits fan 12 to operate as described herein. Alternatively, fan 12 may include only one of inlet ring 18 and rear plate 16.

During operation, air enters fan assembly 10 through central air inlet 20 and is deflected radially outward from central axis 22 toward blades 14. Blades 14 are configured to pull the air through inlet 20 into a central chamber 26 of fan 12. The air passes through channels between blades 14 and is forced outward through outlet 24 due to the centrifugal force generated by rotating blades 14. In addition, in some known fans, the volume of airflow forced outward changes with respect to the speed of the fan's rotation.

Figure 3:
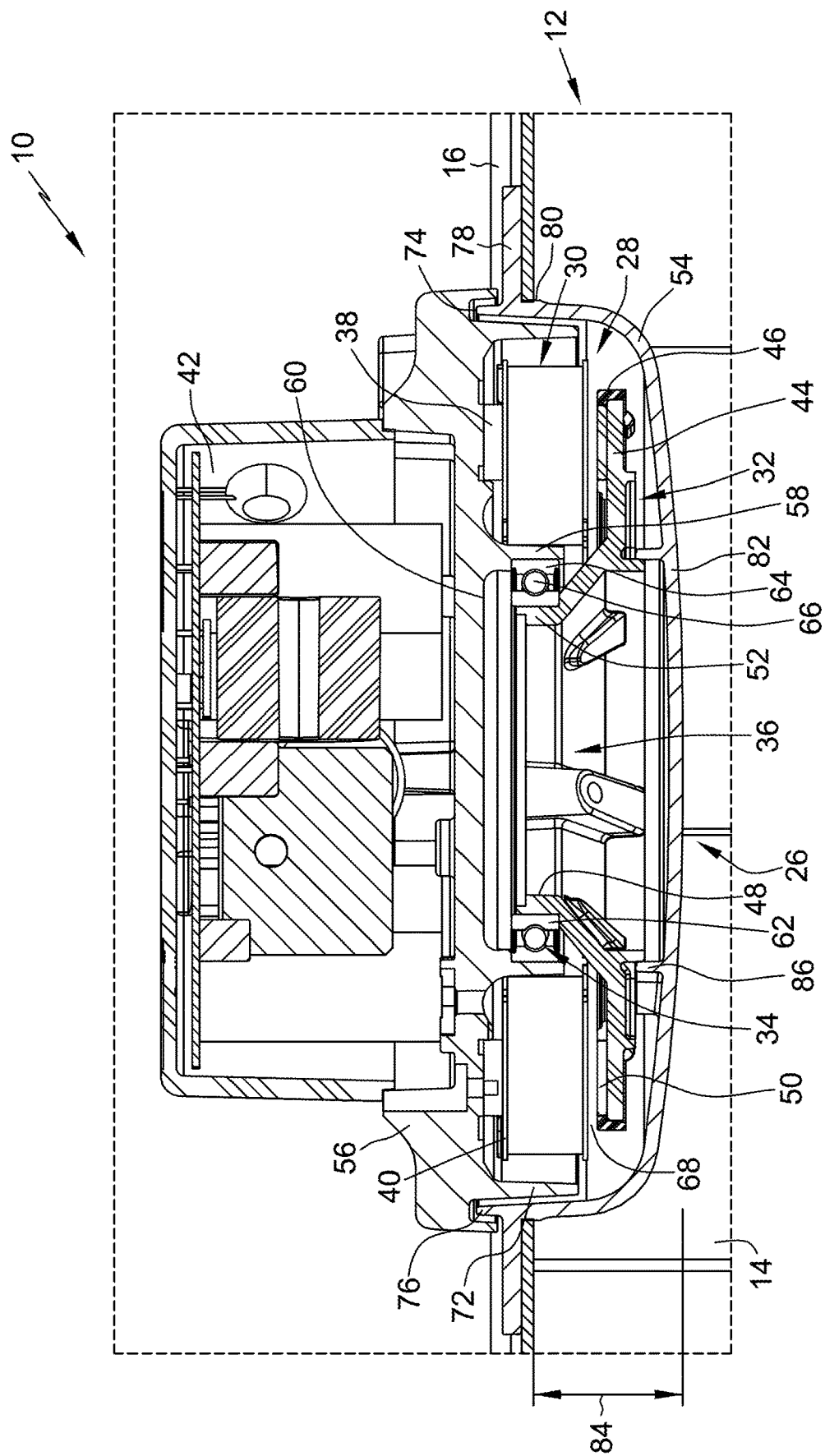
FIG. 3 is an enlarged cross-sectional view of a portion of the fan assembly outlined by box 3-3 shown in FIG. 2.

FIG. 3 is an enlarged view of a portion of FIG. 2 identified by box 3-3. Fan assembly 10 also includes a motor 28 coupled to rear plate 16 of fan 12. In one embodiment, motor 28 is an axial flux electric motor configured to rotate fan 12 about axis 22. Motor 28 includes a stator 30, a rotor assembly 32, and a bearing assembly 34 coupled radially therebetween. Stator 30, rotor assembly 32, and bearing assembly 34 each include a concentric opening 36 oriented about axis 22. Stator 30 includes a plurality of circumferentially-spaced stator teeth 38 that extend in a direction parallel to axis of rotation 22 such that a slot (not shown) is formed between each adjacent tooth 38. Furthermore, each slot between adjacent stator teeth 38 is easily accessible for receiving one of a plurality of copper windings 40. In this embodiment, stator 30 is a strip wound core manufactured from a long ribbon made of steel or soft magnetic composite (SMC) material wound into a toroidal shape. A number of slots (not shown) are punched into a single layer of the ribbon by a punch and wind machine (not shown), and as the ribbon is wound, the slots of the single layers combine to form the slots and teeth 38.

Copper windings 40 each include an opening (not shown) that closely conforms to an external shape of one of a plurality of stator teeth 38 such that each stator tooth 38 is configured to be positioned within a winding 40. Motor 28 may include one winding 40 per stator tooth 38 or one winding 40 positioned on every other tooth 38. Each winding 40 may be insulated from adjacent windings 40 by an insulating layer (not shown). A motor controller 42 is coupled to at least one winding 40, and is configured to apply a voltage to one or more of windings 40 at a time for commutating windings in a preselected sequence to rotate rotor assembly 32 about axis 22.

Rotor assembly 32 includes a rotor disk 44 having an axially inner surface 46 and a radially inner wall 48 that at least partially defines opening 36. Rotor assembly 32 also includes a plurality of permanent magnets 50 coupled to inner surface 46 of rotor disk 44. In one embodiment, magnets 50 are coupled to rotor disk 44 using an adhesive. Alternatively, magnets 50 are coupled to disk 44 using any retention method that facilitates operation of motor 28 as described herein. The plurality of permanent magnets 50 are symmetrical, which facilitates manufacturing a single magnet design for use with each magnet 50 within the plurality of permanent magnets 50. Furthermore, each magnet 50 has a substantially flat profile which minimizes waste during manufacturing, and therefore, minimizes cost. Magnets 50 may be composed of Neodymium Iron Boron (NdFeB) material, however alternative materials such as, but not limited to, Samarium Cobalt or Ferrite are suitable. Rotor assembly 32 also includes a primary bearing locator 52 proximate radially inner wall 48 for facilitating proper positioning of bearing assembly 34.

In the exemplary embodiment, rotor disk 44 is machined and/or cast from a solid metal, such as, but not limited to steel and/or iron. In an alternative embodiment, rotor disk 44 is manufactured using a sintering process from, for example, Soft Magnetic Alloy (SMA), SMC, and/or powdered ferrite materials. Similarly, stator 30 is comprised of a metal, such as a steel alloy, that provides a magnetic attraction between permanent magnets 50 and stator 30 to retain rotor disk 44, bearing assembly 34, and stator 30 in place within motor 28 such that motor 28 does not require a shaft.

Fan assembly 10 further includes a hub 54 and a midshield 56 that facilitate coupling motor 28 and controller 42 to fan 12. Midshield 56 is coupled between controller 42 and stator 30 and is configured to maintain a stationary position of stator 30 and bearing assembly 34 during rotation of fan 12 and rotor assembly 32. Midshield 56 includes a secondary bearing locator 58 extending from an inner surface 60 of midshield 56 that facilitates retaining bearing assembly 34 in place. Bearing assembly 34 is secured between secondary bearing locator 58 and primary bearing locator 52 and includes an inner race 62, an outer race 64, and a plurality of ball bearings 66 positioned therebetween. Primary bearing locator 52 engages and locates bearing assembly 34 by engaging inner race 62. Secondary bearing locator 58 engages outer race 64 to further position and secure bearing assembly 34 such that bearing assembly 34 is positioned radially inward from and concentric with stator 30.

Midshield 56 also includes a plurality of fins 70 (best shown in FIG. 1) that facilitate cooling motor 28 and a substantially annular protection flange 72 extending axially inward from inner surface 60 toward chamber 26 of fan 12. Flange 72 extends axially inward a distance substantially equal to a length of each stator tooth 38 such that flange 72 protects the plurality of stator teeth 38 from rotating portions of fan assembly 10, such as hub 54 and fan 12. Midshield also includes a substantially circular groove 74 positioned immediately radially outward of flange 72 and configured to accept at least a portion of hub 54.

In one embodiment, hub 54 is substantially bowl-shaped and is configured to couple motor 28 to fan 12. More specifically, hub 54 is configured to couple rotor disk 44 of rotor assembly 32 to rear plate 16 of fan 12 to facilitate rotation of fan 12 about axis 22. Hub 54 includes a substantially circular end portion 76 that is configured to be seated within groove 74 of midshield 56. Hub 54 also includes a radial flange 78 extending radially outward from hub 54 proximate end portion 76. Radial flange 78 includes a plurality of openings (not shown) that correspond to a plurality openings (not shown) in rear plate 16 of fan 12. In one embodiment, radial flange 78 is coupled to fan rear plate 16 by threading a fastener (not shown) through each concentric opening on radial flange 78 and rear plate 16. In an alternative embodiment, radial flange 78 may be coupled to rear plate 16 in any manner, such as by welding, that facilitates operation of fan assembly 10 as described herein.

Radial flange 78 is coupled opposite blades 14 to rear plate 16 such that hub 54 extends through an opening 80 in rear plate 16 and into chamber 26 of fan 12. Opening 80 has a standard size diameter that may be found in at least some known centrifugal plug fans. The standard diameter of opening 80 facilitates removing a first motor and installing motor 28 within fan assembly 10. In one embodiment, hub 54 includes a bowl-shaped portion 82 that extends a distance 84 into fan chamber 26 from rear plate 16. Distance 84 is less than a distance that at least some known motors extend into chamber 26 of fan 12. More specifically, at least some known radial flux motors extend a distance farther than distance 84 into chamber 26. The farther a motor extends into chamber 26, the more the motor will interfere with the airflow within chamber 26. Such interference generally results in a loss in fan efficiency. Therefore, minimal intrusion into chamber 26 results in optimum efficiency. In the embodiment shown in FIG. 3, hub bowl portion 82 extends approximately 30 millimeters into fan chamber 26 such that bowl portion 82 reduces or prevents interference between the airflow and motor 26, which facilitates increasing fan assembly 10 efficiency. Furthermore, hub bowl portion 82 includes a contoured shape that is configured to facilitate a smooth airflow around hub 54.

Hub bowl portion 82 also includes an axial flange 86 that extends substantially axially toward rotor assembly 32 from bowl portion 82. Axial flange 86 is configured to be coupled to rotor disk 44 to facilitate rotation of fan 12. In operation, windings 40 coupled to stator 30 are energized in a chronological sequence by controller 42 that provides an axial magnetic field which moves clockwise or counterclockwise around stator 30 depending on the pre-determined sequence or order in which windings 40 are energized. This moving magnetic field intersects with the flux field created by the plurality of permanent magnets 50 to cause rotor assembly 32 to rotate about axis 22 relative to stator 30 in the desired direction to develop a torque which is a direct function of the intensities or strengths of the magnetic fields. Specifically, because hub 54 is coupled to rotor disk 44 via axial flange 86, rotation of rotor assembly 32 facilitates rotation of hub 54. Similarly, because rear plate 12 is coupled to hub 54, such as with radial flange 78, rotation of hub 54 facilitates rotation of fan 12.

Figure 4:
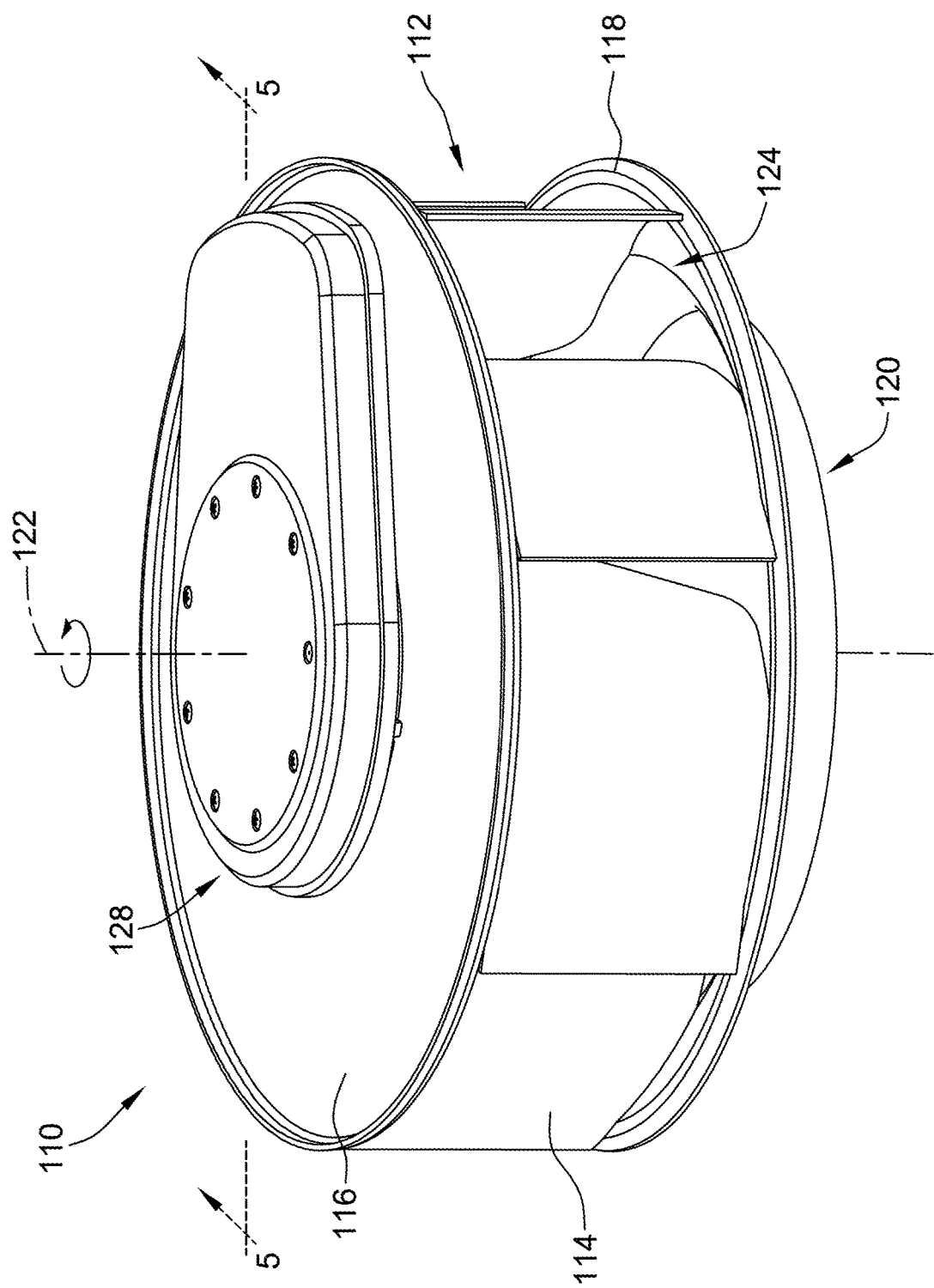
FIG. 4 is a perspective view of another embodiment of a fan assembly.
Figure 5:
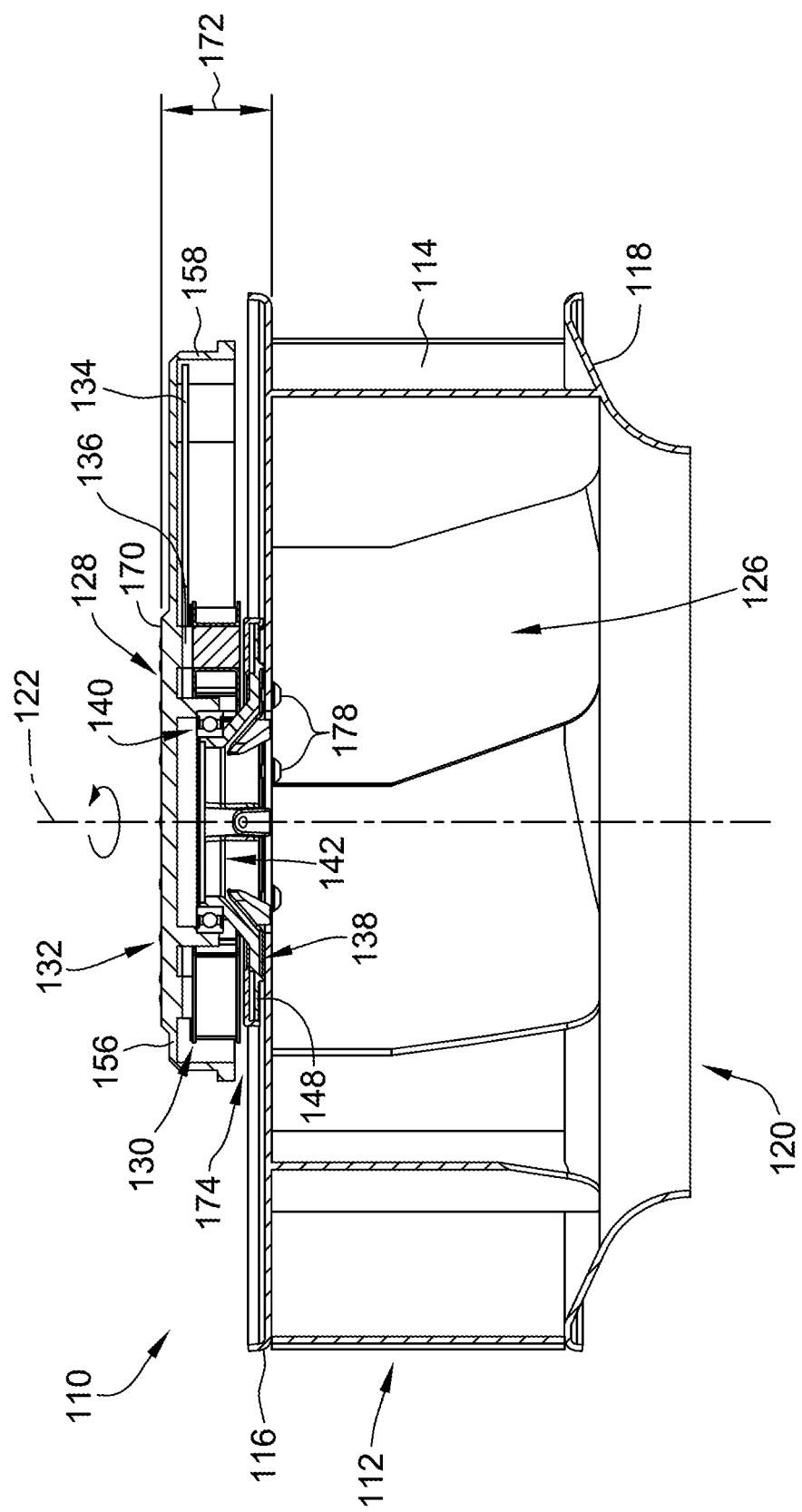
FIG. 5 is a cross-sectional view of the fan assembly of FIG. 4 taken along line 5-5.

FIG. 4 is a perspective view of an alternative embodiment of a centrifugal fan assembly 110, and FIG. 5 is a cross-sectional view of fan assembly 110. In the alternative embodiment, fan assembly 110 is configured to produce a flow of air for a forced air system, e.g., a commercial or industrial HVAC system. Fan assembly 110 includes a fan 112 that includes a plurality of blades 114 coupled between a rear plate 116 and an inlet ring 118. Inlet ring 118 includes a central air inlet 120. In the embodiment, fan 112 is a backward curved plug fan. Alternatively, fan 112 may have any suitable blade shape, for example a backward curved blade, an airfoil blade, a backward inclined blade, a forward curved blade, and a radial blade, that enables fan assembly 110 to operate as described herein.

Rear plate 116 and inlet ring 118 are coaxial or substantially coaxial and configured to rotate about a center axis 122. Blades 114 are attached to rear plate 116 and/or inlet ring 118 such that a longitudinal axis of blades 114 is substantially parallel to center axis 122. In one embodiment, each blade 114 may be attached to rear plate 116 and/or inlet ring 118 via features formed in rear plate 116 and/or inlet ring 118 such as an opening, e.g., a groove or a slot, configured to restrict an amount of movement of blade 114 between rear plate 116 and inlet ring 118 while permitting blades 114 to operate as described herein. During rotation, blades 114 are configured to pull in air along center axis 122 and eject the air radially outward through an outlet 124 located between adjacent blades 114. Blades 114 may be coupled to rear plate 116 and/or inlet ring 118 in any manner that permits fan 112 to operate as described herein. Alternatively, fan 112 may include only one of inlet ring 118 and rear plate 116.

In the alternative embodiment, when fan assembly 110 operates, air enters through central air inlet 120 and is deflected radially outward from central axis 122 of fan assembly 110 towards blades 114. Blades 114 are configured to pull the air through inlet 120 into an inner fan chamber 126 of fan 112. The air passes through channels between blades 14 and is forced outwards through outlet 124 due to the centrifugal force generated by rotating blades 114. In addition, in some known fans, the volume of airflow forced outwards changes with respect to the speed of the fan's rotation.

Figure 6:
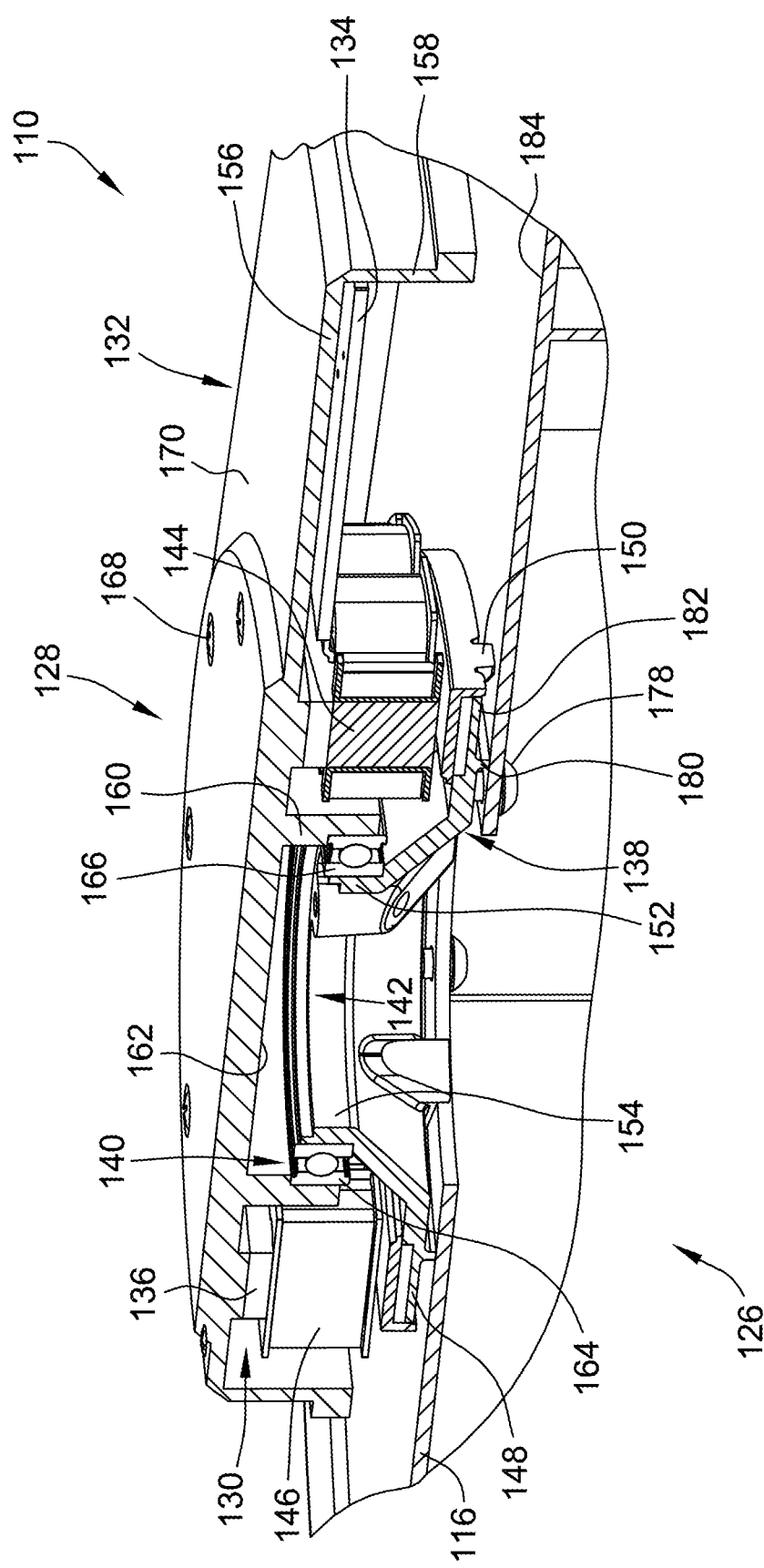
FIG. 6 is a perspective cross-sectional view of fan assembly shown in FIG. 4 illustrating a motor assembly.

FIG. 6 is a perspective cross-sectional view of fan assembly 110 that also includes a motor assembly 128 coupled to rear plate 116 of fan 112. In the alternative embodiment, motor assembly 128 includes a motor 130, a motor case 132, and a motor controller 134. Motor 130 is an axial flux electric motor configured to rotate fan 112 about axis 122. Motor 130 includes a stator 136, a rotor assembly 138, and a bearing assembly 140 coupled radially therebetween. Stator 136, rotor assembly 138, and bearing assembly 140 each include a concentric opening 142 oriented about axis 122. Stator 136 includes a plurality of circumferentially-spaced stator teeth 144 that extend in a direction parallel to axis of rotation 122 such that a slot (not shown) is formed between each adjacent tooth 144. Similar to stator 30 (shown in FIG. 1), stator 136 is a strip wound core manufactured from a long ribbon made of steel or SMC material wound into a toroidal shape.

Motor 130 also includes a plurality of copper windings 146 that each include an opening (not shown) closely conforming to an external shape of one of a plurality of stator teeth 144 such that each stator tooth 144 is configured to be positioned within a winding 146. Motor 130 may include one winding 146 per stator tooth 144 or one winding 146 positioned on every other tooth 144. Motor controller 134 is coupled to at least one winding 146 such that motor controller 134 is positioned adjacent motor 130, and is configured to apply a voltage to one or more of windings 146 at a time for commutating windings 146 in a preselected sequence to rotate rotor assembly 138 about axis 122.

Rotor assembly 138 includes a rotor disk 148, substantially similar to rotor disk 44 (shown in FIG. 3), and an annular magnet retainer 150 configured to couple a plurality of permanent magnets (not shown) to rotor disk 148. The magnets are substantially similar to permanent magnets 50 (shown in FIG. 3). In another embodiment, the magnets may be coupled to rotor disk 148 using an adhesive. Generally, the magnets are coupled to disk 148 using any retention method that facilitates operation of motor 130 as described herein. Stator 136 is comprised of a metal, such as a steel alloy, that provides a magnetic attraction between the permanent magnets and stator 136 to retain rotor disk 148, bearing assembly 140, and stator 136 in place within motor 130 such that motor 130 does not require a shaft. Rotor disk 144 also includes a primary bearing locator 152 configured to properly position bearing assembly 140. Primary bearing locator 152 includes a radially inner wall 154 that at least partially defines opening 142.

In the embodiment shown in FIGS. 4-7, fan assembly 110 further includes motor case 134 configured to provide a protective covering for motor 130 and controller 134. Case 132 is a unitary cast component that includes a cap portion 165 oriented substantially parallel with rear plate 116, and an integrated flange 158 that extends axially towards rear plate 116 from a circumferential edge of cap portion 156. Case 132 is configured to maintain a stationary position of stator 136 and bearing assembly 140 during rotation of fan 112 and rotor assembly 138. Case 132 also includes a secondary bearing locator 160 extending from an inner surface 162 of case 132 that facilitates retaining bearing assembly 140 in place. More specifically, secondary bearing locator 160 engages an outer race 164 of bearing assembly 140 and primary bearing locator 152 engages an inner race 166 of bearing assembly 140 such that bearing assembly 140 is positioned radially inward from and concentric with stator 136.

Case 132 is coupled to stator 136 via a plurality of fasteners 168 extending through an axially outermost surface 170 of cap portion 156. In this embodiment, case 132 is coupled to motor 130 such that cap portion 156 is positioned minimal distance from rear plate 116. More specifically, outer surface 170 of cap portion 165 is spaced a distance 172 in a range of between approximately 20 millimeters (mm) to approximately 50 mm away from rear plate 116, and more precisely, outer surface 170 of cap portion is spaced a distance 172 in a range of between approximately 36 mm to approximately 40 mm away from rear plate 116. Furthermore, flange 158 extends from cap portion 156 such that a gap 174 is formed between a distal end of flange 158, which is the axially innermost surface of case 132, and rear plate 116. In one embodiment, gap 174 defines a distance in a range of between approximately 10 mm and approximately 15 mm. In other embodiments, gap 174 defines any distance that facilitates operation of fan assembly 110 as described herein. As such, case 132 is not directly coupled to rear plate 116, or any other portion, of fan 112.

Figure 7:
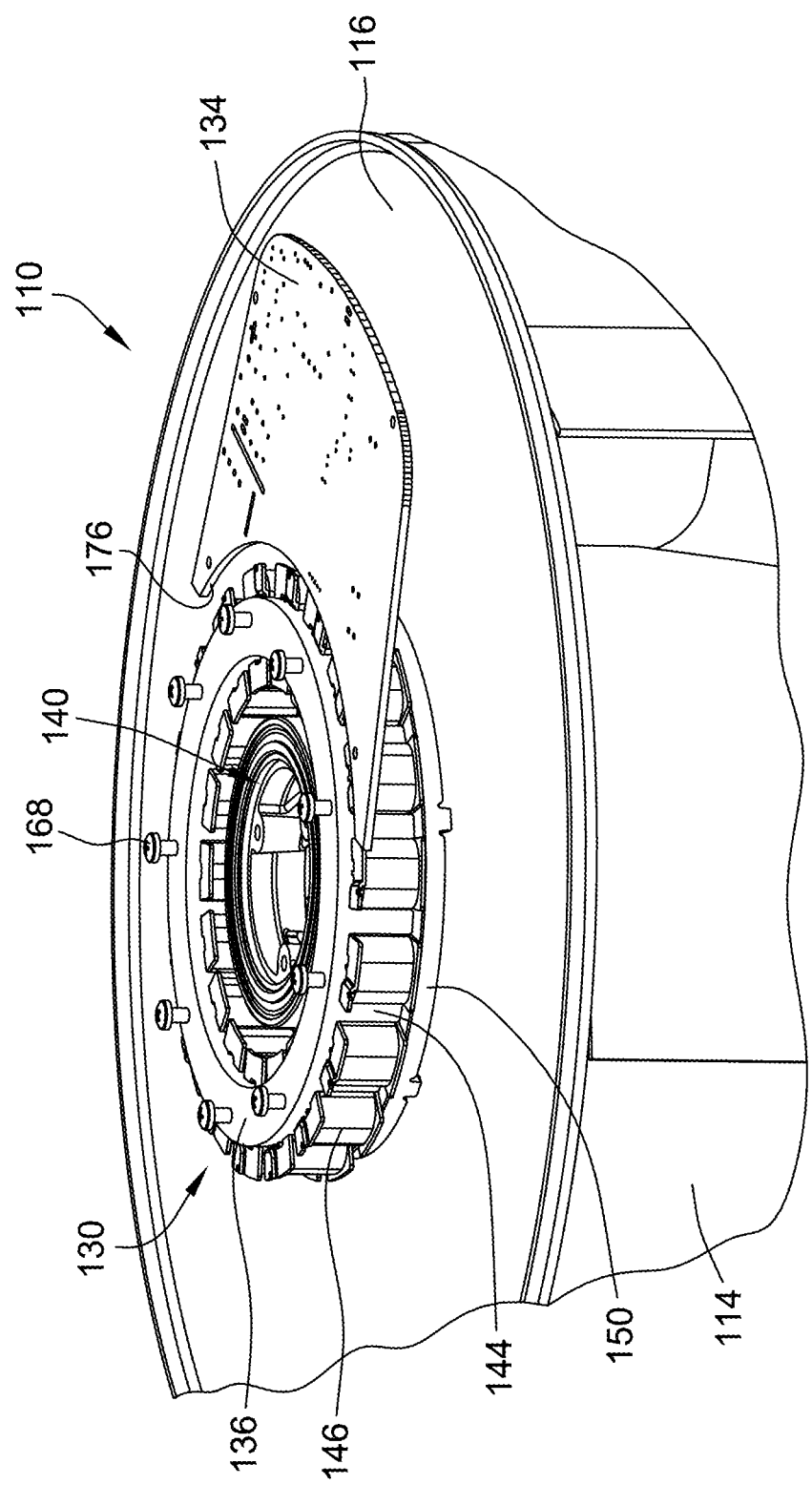
FIG. 7 is a perspective view of the motor assembly shown in FIG. 6 with the motor case removed.

As described above, motor controller 134 is coupled within motor assembly 128 adjacent to motor 130 such that controller 134 is positioned radially outward from and substantially planar with stator 136. A such, controller 134 is not oriented axially from motor 130, as in fan assembly 10 (shown in FIG. 1). Controller 134 includes an arcuate cutout 176, as best shown in FIG. 7 having case 132 removed for clarity. Cutout 176 is configured to correspond to a circumference of motor 130, more specifically, to a circumference of stator 136 such that controller 134 is oriented at least partially about motor 130. In one embodiment, controller 134 is a substantially planar printed circuit board that allows for significant reduction in motor assembly thickness, which may be desired for some users. In other embodiments, controller 134 may be positioned at any location in motor assembly 128 and have any thickness that facilitates operation of fan assembly 110 as described herein.

As shown in FIGS. 5 and 6, motor assembly 128 is coupled to fan 112 such that motor assembly 128 is positioned entirely outside fan chamber 126. That is, motor assembly 128 is coupled to fan 112 such that no portion of motor assembly 128 extends through rear plate 116 to intrude into chamber 126. As such, air is able to flow within chamber 126 free of disturbances and without being directed around a motor, as is the case in at least some known fan assemblies having radial flux motor. As described above, the farther a motor extends into a fan chamber, the more the motor will interfere with the airflow within the chamber. Such interference generally results in a loss in fan efficiency. Therefore, zero intrusion of motor assembly 128 into chamber 126 prevents such a loss in efficiency and provides for an increased efficiency of fan assembly 110 as compared to at least some known fan assemblies having radial flux motors that extend a significant distance into the fan chamber.

Furthermore, fan assembly 110 does not include hub 54 or midshield 56 (both shown in FIG. 3) to couple motor assembly 128 to fan 112. In one embodiment, motor assembly 128 is coupled directly to rear plate 116 of fan 112 to facilitate rotation of fan 112 about center axis 122. More specifically, rotor disk 138 is coupled directly to rear plate 116 via a plurality of fasteners 178 threaded through corresponding openings formed in rear plate 116. In another embodiment, rotor disk 138 may be coupled to rear plate 116 in any manner that facilitates operation of fan assembly 110 as described herein. Rotor disk 138 includes an axial flange 180 that extends from an inner surface 182 of rotor disk 138 to an outer surface 184 of rear plate 116. Flange 180 is configured to space rotor disk 138 a distance from rear plate 116 to facilitate proper alignment or rotor assembly 138 during operation of fan assembly 110.

In operation, windings 146 coupled to stator 136 are energized in a chronological sequence by controller 134 that provides an axial magnetic field which moves clockwise or counterclockwise around stator 136 depending on the predetermined sequence or order in which windings 146 are energized. This moving magnetic field intersects with the flux field created by the plurality of permanent magnets to cause rotor assembly 138 to rotate about axis 122 relative to stator 136 in the desired direction to develop a torque which is a direct function of the intensities or strengths of the magnetic fields. Specifically, because rotor disk 148 of rotor assembly 138 is coupled directly to rear plate 116 of fan 112, rotation of rotor disk 148 facilitates rotation of fan 112.

Figure 8:
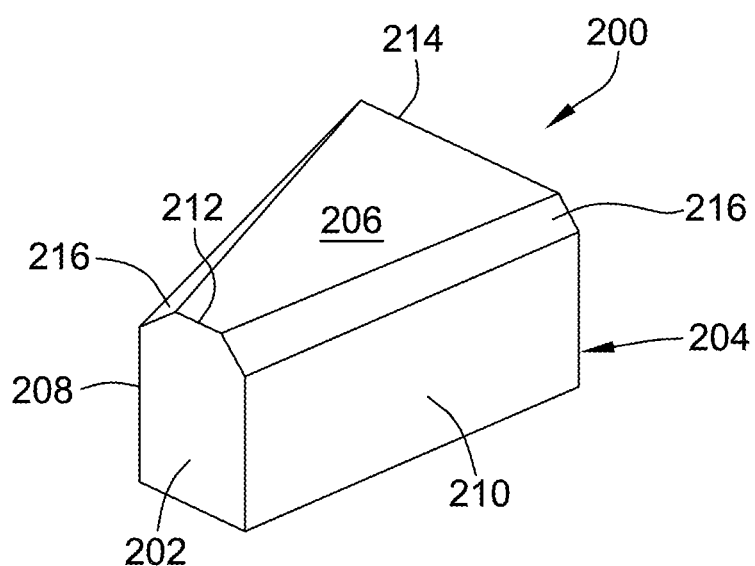
FIG. 8 is a perspective view of a stator tooth that may be used in either fan assemblies shown in FIGS. 1 and 4.

FIG. 8 illustrates a single stator tooth 200 of the pluralities of stator teeth 38 (shown in FIG. 3) and 144 (shown in FIG. 6). Stators 30 (shown in FIG. 3) and 136 (shown in FIG. 6) are substantially similar such that stator teeth 38 and 144 are also substantially similar. Each stator tooth 200 includes a radially inner surface 202 that at least partially defines an inner diameter (not shown) of stators 30 and 136 and a radially outer surface 204 that at least partially defines an outer diameter (not shown) of stators 30 and 136. Moreover, each tooth 200 includes a top surface 206 proximate rotor assemblies 32 (shown in FIG. 3) and 138 (shown in FIG. 6) and two opposing circumferential sides that include a first side 208 and a second side 210. A radially inner edge 212 is defined at the intersection of radially inner face 202 and top surface 206. Similarly, a radially outer edge 214 is defined at the intersection of radially outer surface 204 and top surface 206. A circumferential width of each tooth 200 decreases in the radially inward direction from surface 204 to surface 202.

In the exemplary embodiment, each tooth 200 also includes a chamfered portion 216 at the intersection of first side 208 and top surface 206 and also at the intersection of second side 210 and top surface 206. Alternatively, teeth 200 may not include chamfered portion 216 such that top surface 206 and circumferential side 208 as well as top surface 206 and side 210 meet at an approximately 90 degree angle. Chamfered portion 216 extends substantially an entire radial length of each tooth 200 between inner surface 202 and outer surface 204. Chamfered portion 216 facilitates reducing torque ripple generated by motors 28 (shown in FIG. 3) and 130 (shown in FIG. 6), and therefore reduces the amount of noise produced by fan assemblies 10 (shown in FIG. 3) and 110 (shown in FIG. 6). Chamfered portion 216 is formed during manufacturing of stators 30 and 136 such that when the punch and wind machine punches a slot from the ribbon, it also forms the chamfer on each stator tooth 200. Previous attempts to chamfer edges resulted in deformed tooth shape. The punch and wind method of manufacturing produces consistent chamfer dimensions along portion 216 without deforming tooth 200. More specifically, the punch and wind machine forms chamfered portions 216 on the circumferential sides 208 and 210 of each tooth 200, while radially inner edge 212 and radially outer edge 214 remain unchanged except to account for chamfered portion 216.

In one embodiment, chamfered portion 216 has a constant width in the range of between approximately 0.5 mm and approximately 2.0 mm between inner surface 202 and outer surface 204. More specifically, chamfered portion 216 has a constant width in the range of between approximately 1.0 mm and approximately 1.5 mm. Alternatively, chamfered portion 216 may have any size chamfer width that facilitates operation of fan assemblies 10 and 110 as described herein. Furthermore, chamfered portion 216 may be tapered to have a varying width that either increases or decreases between surfaces 202 and 204. Chamfered portion 216 produces a significant drop in an amount of motor torque ripple with only minimal losses in actual torque produced by motor 28. For example, chamfered portion 216 results in an approximate 50% loss in torque ripple at a chamfer width of 1.14 mm, while only resulting in an approximate 2% loss in overall torque production at the chamfer width of 1.14 mm. Such a reduction in torque ripple results in motors 28 and 130, and therefore fan assemblies 10 and 110, being significantly quieter during operation, while maintaining substantially the same amount of torque production.

The present disclosure provides fan and motor assemblies with improved structural designs that improve air flow entering the fan, through the fan, and downstream of the fan. More specifically, one fan assembly includes an axial flux electric motor and hub that each reduce airflow restriction and downstream disturbances in the airflow, which results in increased efficiency. More specifically, the motor and hub protrude a minimal distance into the chamber of the fan to reduce interference with the airflow as compared to at least some known fan assemblies. Furthermore, the hub is coupled to the rotor assembly and the fan in such a manner that enables the motor to rotate the fan without the use of a driveshaft.

Another embodiment of a fan assembly includes an axial flux motor that is coupled to the fan such that the motor does not intrude into an inner fan chamber and is positioned entirely outside the fan chamber to facilitate preventing interference between the motor and an airflow within the fan chamber, which results in increased efficiency. More specifically, the motor includes a rotor that is coupled directly to a rear plate of the fan to facilitate rotation of the fan. The fan assembly also includes a substantially planar motor controller coupled radially outward from a motor stator. The planar controller enables a low profile motor case to cover the motor and the controller such that the case extends a minimal distance from the fan rear plate as compared to some fan assemblies. As such, the fan assembly takes up less space within an HVAC system and provides for additional space for added HVAC components. Furthermore, the fan assembly contains fewer overall components, which provides for a fan assembly that is less expensive and simpler to assemble than other known fan assemblies.

Additionally, the stator teeth within the motor are manufactured with chamfers on the circumferential sides of each stator tooth. The chamfered stator teeth facilitate reducing the torque ripple, and therefore the noise, generated by the fan assembly, while maintaining a substantially constant amount of torque generated by the motor.

The embodiments described herein relate to a centrifugal fan assembly and methods of assembling the same. More specifically, the embodiments relate to fan assemblies that includes a backward curved fan and an axial flux electric motor that reduces or prevents airflow interference within the fan and improves the efficiency of the fan assembly. More particularly, one embodiment relates to coupling the motor to the fan such that the motor extends a minimal distance into the fan chamber, and another embodiment includes the motor coupled to the fan such that the motor does not intrude into the fan chamber. The methods and apparatus are not limited to the specific embodiments described herein, but rather, components of apparatus and/or steps of the methods may be utilized independently and separately from other components and/or steps described herein. For example, the methods may also be used in combination with a forward curved fan or blower assembly, and are not limited to practice with only the backward curved fan as described herein. In addition, the embodiment can be implemented and utilized in connection with many other HVAC applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fan assembly having an axis of rotation and comprising:
    a fan comprising an inlet ring and a rear plate that together define an inner fan chamber and a chamber length therebetween, wherein said rear plate defines an opening, and wherein said fan is a backward curved plug fan; and
    an axial flux motor coupled to said rear plate to facilitate rotation of said fan about the axis, wherein said motor extends a predetermined distance from said rear plate through said opening into said fan chamber to facilitate reducing interference between said motor and an airflow within said fan chamber, wherein said predetermined distance is less than said chamber length, wherein said motor does not include a shaft.

2. The fan assembly according to claim 1 further comprising a hub portion coupled within said opening between said motor and said fan such that said motor is configured to be housed within said hub portion.

3. The fan assembly according to claim 2, wherein said hub portion includes a radial flange coupled to said rear plate and an axial flange configured to be coupled to a rotor assembly of said motor, wherein said radial and axial flanges are configured to facilitate rotating said fan during rotation of said rotor assembly.

4. The fan assembly according to claim 1, further comprising a motor controller and a midshield coupled between said motor controller and said motor.

5. The fan assembly according to claim 4, wherein said midshield includes a substantially circular axial flange extending around at least a portion of said motor.

6. The fan assembly according to claim 1, wherein said stator includes a plurality of circumferentially-spaced stator teeth, each tooth of said plurality of teeth including at least one chamfered portion.

7. The fan assembly according to claim 1 wherein said motor terminates within said fan chamber.

8. A fan assembly having an axis of rotation and comprising:
    a fan comprising an inlet ring and a rear plate that together define an inner fan chamber, and wherein said fan is a backward curved plug fan; and
    an axial flux motor comprising a stator and a rotor, said motor coupled to said rear plate such that said motor is positioned entirely outside said fan chamber to facilitate preventing interference between said motor and an airflow within said fan chamber; and a motor controller coupled to said axial flux motor, wherein said motor controller is positioned radially outward from said stator, wherein said stator includes a circumference and said motor controller includes an arcuate cutout having a curvature that corresponds to said stator circumference.

9. The fan assembly according to claim 8, wherein said motor is coupled directly to said fan to facilitate rotation of said fan.

10. The fan assembly according to claim 8, wherein said rotor is coupled directly to said rear plate to facilitate rotation of said fan.

11. The fan assembly according to claim 8 further comprising a motor controller coupled to said motor, wherein said motor controller is substantially planar.

12. The fan assembly according to claim 8 further comprising a unitary motor case coupled to said stator, said motor case configured to cover said motor.

13. The fan assembly according to claim 12, wherein said motor case includes an axially outermost surface positioned in a range of between approximately 20 millimeters (mm) and approximately 50 mm from said rear plate.

14. The fan assembly according to claim 8, wherein said stator includes a plurality of circumferentially-spaced stator teeth, each tooth of said plurality of teeth including at least one chamfered portion.

15. A method for assembling a fan assembly having an axis of rotation, said method comprising:

providing a fan including an inlet ring and a rear plate that together define an inner fan chamber, and wherein said fan is a backward curved plug fan; and coupling an axial flux motor to the rear plate such that the motor is positioned entirely outside the fan chamber to facilitate preventing interference between the motor and an airflow within the fan chamber, wherein the motor includes a stator and a rotor; and coupling a motor controller to the motor such that the motor controller is positioned radially outward from the stator, wherein the motor controller includes an arcuate cutout having a curvature that corresponds to a circumference of the stator.

16. The method according to claim 15, wherein coupling the motor to the rear plate further comprises coupling the rotor directly to the rear plate to facilitate rotation of said fan.

17. The method according to claim 15 further comprising coupling a unitary motor case to the stator, wherein the motor case is configured to cover the motor.

18. The method according to claim 17, wherein coupling the unitary motor case to the stator further comprises connecting the motor case to the stator such that an axially outermost surface of the motor case is positioned in a range of between approximately 20 millimeters (mm) and approximately 50 mm from the rear plate.

* * * * *